United States Patent

Martin et al.

[15] 3,669,473

[45] June 13, 1972

[54] FLEXIBLE COUPLING

[72] Inventors: Ronald C. Martin, Waterville, Ohio; Marty E. Sixt, Iowa City, Iowa

[73] Assignee: Advance Drainage Systems, Inc., Waterville, Ohio

[22] Filed: Dec. 11, 1970

[21] Appl. No.: 97,149

[52] U.S. Cl. .................... 285/197, 285/DIG. 4, 285/DIG. 22
[51] Int. Cl. ........................................................ F16l 41/06
[58] Field of Search .............. 285/197, DIG. 4, DIG. 22, 419, 285/373, 198, 199, 156, 424; 138/97, 99

[56] References Cited

UNITED STATES PATENTS

| 2,942,902 | 6/1960 | Rowland | 285/197 X |
|---|---|---|---|
| 3,551,007 | 12/1970 | Martin et al. | 285/156 |
| 1,908,821 | 5/1933 | Cornell | 285/DIG. 22 |
| 3,471,179 | 10/1969 | Sixt | 285/419 X |
| 3,501,179 | 3/1970 | Boynton et al. | 285/373 |
| 3,239,254 | 3/1966 | Campbell | 285/419 X |
| 1,661,674 | 3/1928 | Osborn | 285/DIG. 22 |
| 2,537,284 | 1/1951 | Schuder | 285/DIG. 22 |
| 3,159,413 | 12/1964 | Silverman | 285/DIG. 22 |

FOREIGN PATENTS OR APPLICATIONS

| 1,026,000 | 4/1966 | Great Britain | 285/197 |
| 28,979 | 12/1912 | Great Britain | 285/DIG. 22 |

*Primary Examiner*—Thomas F. Callaghan
*Attorney*—Connolly and Hutz

[57] ABSTRACT

Flexible coupling for interconnecting tubular lateral line with unbroken tubular main line comprises T-shaped tubular body section having first leg with second leg integrally connected to first leg at angle thereto. Slot in first leg extends full length thereof so that first leg may be expanded open and snapped onto unbroken tubular main line to facilitate interconnection of tubular lateral line with main line when lateral line is secured to free end of second leg of tubular body section.

8 Claims, 9 Drawing Figures

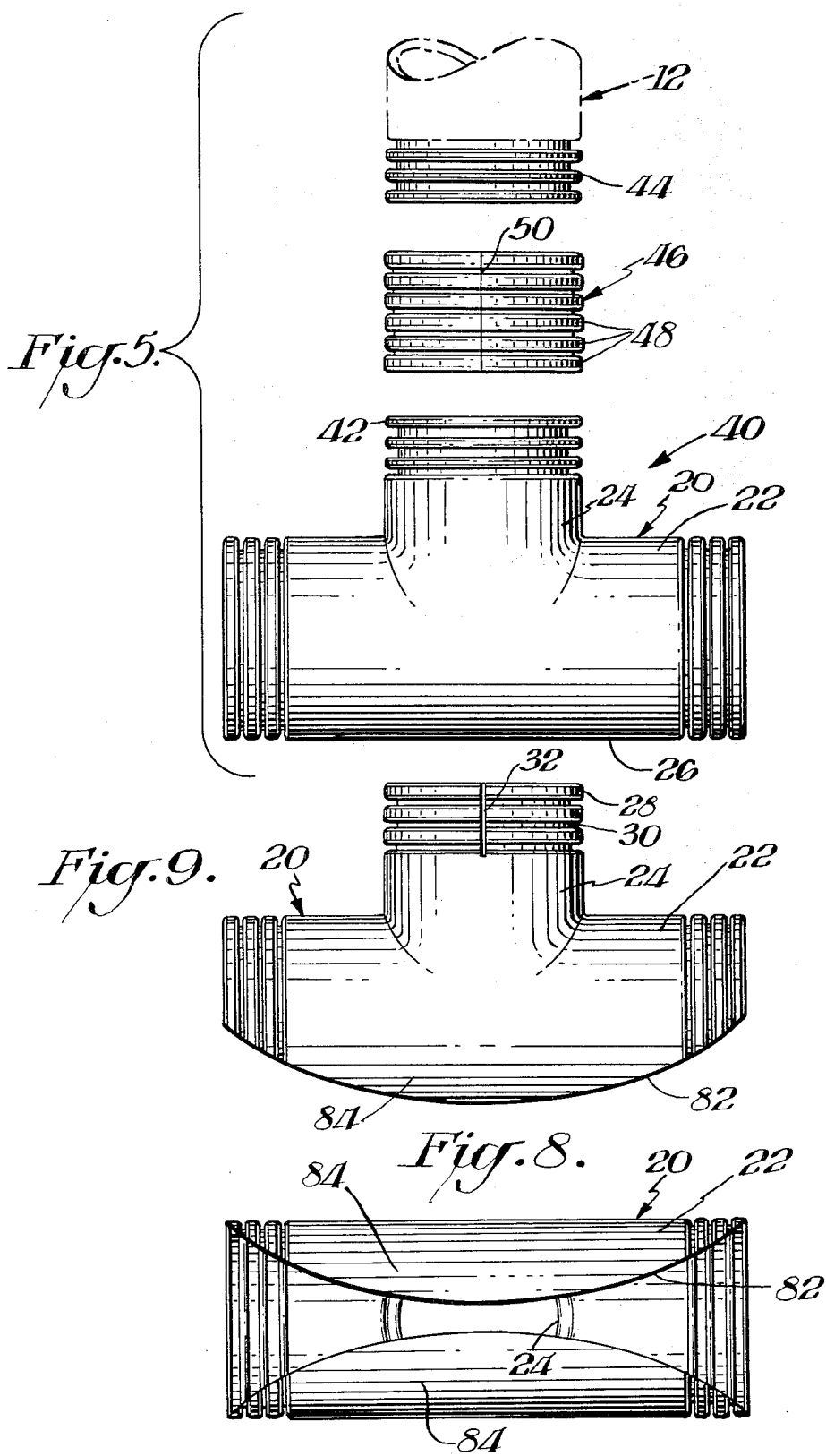

FLEXIBLE COUPLING

BACKGROUND OF THE INVENTION

The present invention relates to a flexible coupling for interconnecting a tubular lateral line with a tubular main line, and more particularly to a flexible coupling that interconnects a lateral line with a continuous main line without breaking the main line.

Subsurface drainage systems fabricated from corrugated tubes molded of thermoplastic material are currently playing a major role in land development and improvement. The advantages of corrugated drainage systems over the heretofore commonly used red clay tile networks are quite numerous. The ease with which corrugated tubes are manufactured by molding techniques in continuous lengths together with the rather simple and inexpensive installation procedures are but a few factors which have contributed to the overwhelming commercial success of corrugated drainage systems. For the most part, such systems include tubular main and lateral subsurface drainage lines comprising corrugated tubing, T-shaped couplings and connectors wherein the short single open ended leg of the tee is disposed at 90° or other angles with respect to the long double open ended leg, and adapters of one type or another. A typical system usually comprises a series of slightly inclined lateral lines spaced from one another in parallel fashion on opposite sides of a slightly inclined main line to which the lateral lines are connected by T-shaped couplings and connectors. The main and lateral lines may be quite long and therefore require the piecing together of various lengths of tubIng. End caps are also needed to close the open ends of the main and lateral lines and thereby prevent the surrounding earth from entering into the drainage system.

In most instances, the various components of a subsurface drainage system are assembled and connected together in insitu at the time the system is installed. Thus, it is important to have fittings, such as couplings, for example, which are easy and simple to use so that the installation procedure can be carried out in an efficient manner. Moreover, it is critical that these fittings function in the manner for which they were intended in order to eliminate troublesome and expensive problem areas which may otherwise occur after the system is installed and the backfilling operation is completed.

Prior to the preset invention connection of a tubular lateral line to a continuous tubular main line required that the main line be broken in order to insert a T-shaped coupling into the main line. The T-shaped coupling with the short leg disposed at 90° or other angles to the long leg is required in order to connect a lateral line to the main line. After the main line was broken the operators performing the installation procedure interconnected the broken ends of the main line with the long leg of the coupling. The lateral line was then connected to the short leg of the coupling to complete the interconnecting procedure.

SUMMARY OF THE INVENTION

It is an object of the present invention to provide a flexible coupling for interconnecting a tubular lateral line with a continuous tubular main line without breaking the main line.

In accordance with the present invention a flexible coupling for interconnecting a tubular lateral line with an unbroken tubular main line comprises a T-shaped tubular body section having a first leg and a second leg integrally connected to the first leg at an angle thereto. A slot in the first leg of the tubular body section extends the full length of the first leg so that the first leg may be expanded open and snapped onto an unbroken main line to facilitate interconnection of a tubular lateral line with the main line when the lateral line is secured to the free end of the second leg of the tubular body section.

In one embodiment of the present invention the second leg of the tubular body section is integrally connected to the first leg thereof at a substantially 90° angle. Also, the slot in the first leg of the tubular body section is disposed so that it is substantially parallel to the longitudinal axis of the first leg.

The end portions of the first and second legs of the tubular body section may comprise corrugations formed by alternating annular peaks and valleys constructed and arranged to tightly fit over corrugated main and lateral lines. A slit is provided in the free end portion of the second leg of the tubular body section which enables the free end portion of the second leg to be expanded open and snapped onto a lateral line to facilitate connection of the lateral line to the second leg of the tubular body section. Alternatively, the second leg of the tubular body section may comprise corrugations substantially similar to the corrugations of a lateral line to be connected thereto. When this configuration is utilized a split coupling may be used to connect the lateral line to the second leg of the tubular body section.

In another embodiment of the instant invention the tubular body section is straight-walled and locking lugs are formed in the body section at each end thereof. The lugs are formed in the body section so that they project into the interior thereof. Each locking lug at the free end portion of the second leg may include a guiding surface portion with an abutment surface portion adjacent the guiding surface portion for preventing removal of tubing from the second leg of the tubular body section. Moreover, the abutment surface portion of each locking lug at the free end portion of the second leg may be planar, and the guiding surface portion may be inclined to cam corrugated tubing into the second leg of the tubular body section. Also, the planar abutment surface portion may be normal to the longitudinal axis of the second leg of the tubular body section.

In another embodiment of the present invention the first leg of the tubular body section includes a pair of arcuate flap portions spaced on opposite sides of the longitudinally oriented slot.

BRIEF DESCRIPTION OF THE DRAWING

Novel features and advantages of the present invention in addition to those mentioned above will become obvious to those skilled in the art from a reading of the following detailed description in conjunction with the accompanying drawing wherein:

FIG. 5 is an exploded top plan view of another flexible coupling according to the present invention illustrating interconnection of a lateral line to the coupling by using a flexible split coupling;

FIG. 8 is a front elevational view of another flexible coupling according to the present invention; and FIG. 9 is a top plan view of the flexible coupling shown in FIG. 8.

DETAILED DESCRIPTION OF THE INVENTION

Figure 1:
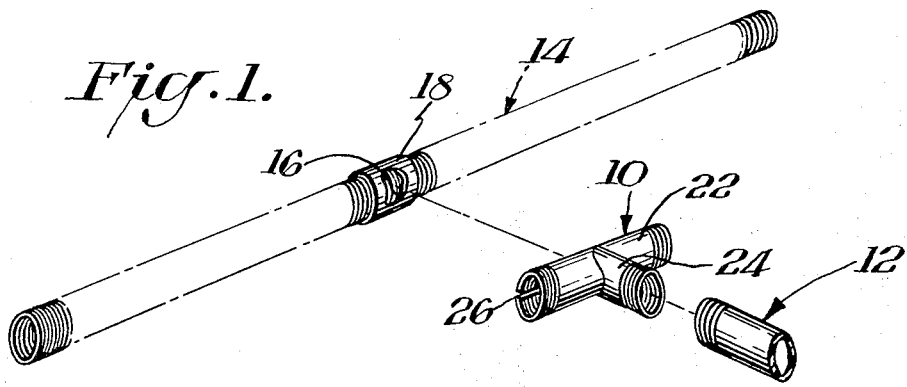
FIG. 1 is an exploded perspective view illustrating the present invention.
Figure 2:
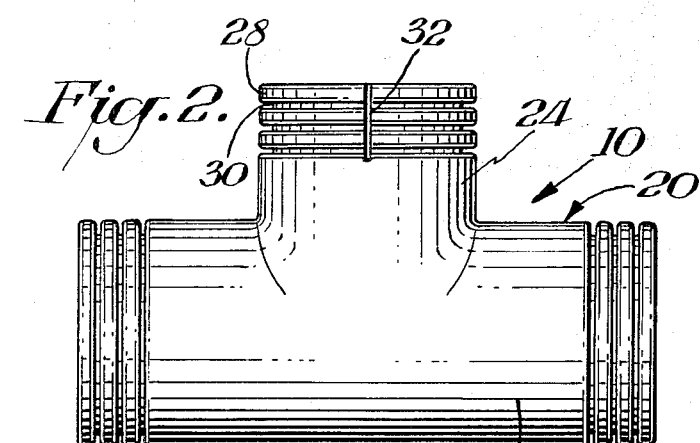
FIG. 2 is a top plan view of a flexible coupling according to the present invention.
Figure 3:
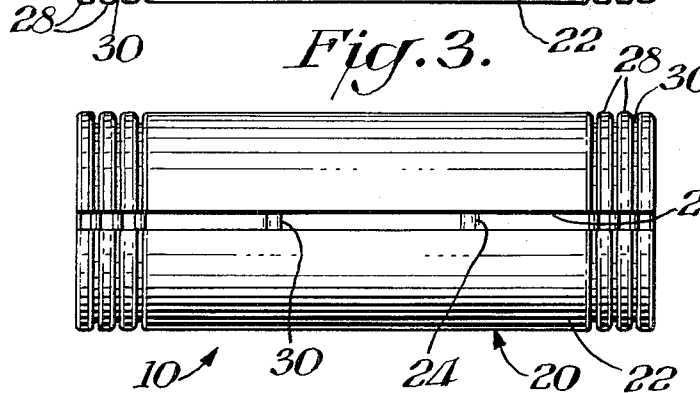
FIG. 3 is a front elevational view of the flexible coupling shown in FIG. 2.
Figure 4:
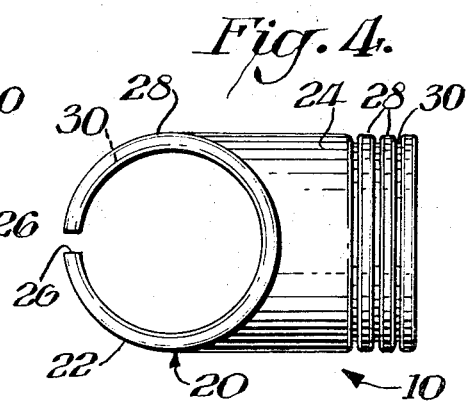
FIG. 4 is a side elevational view of the flexible coupling shown in FIG. 2.

Referring in more particularity to the drawing, FIGS. 1–4 illustrate a flexible coupling 10 for interconnecting a tubular lateral line 12 with an unbroken tubular main line 14. The lateral and main lines are molded from thermoplastic material by techniques known in the art and comprise corrugated tubing formed by alternating annular peaks and annular valleys.

The flexible coupling 10 of the present invention has a uniform thickness throughout and is utilized to connect the tubular lateral line 12 to the main line 14 without breaking or otherwise severing the main line. Connection of the lateral line 12 is accomplished by cutting an opening 16 in the main line 14 and then securing the flexible coupling 10 to the main line so that the single open ended leg is in alignment with the opening 16 in the main line. A template 18 may be used to facilitate cutting the opening 16 in the main line 14.

The flexible coupling 10 illustrated in FIGS. 1–4 comprises a T-shaped tubular body section 20 having a first or double open ended leg 22 and a second or single open ended leg 24 integrally connected to the first leg at an angle thereto. As is clear from FIG. 2, the second leg 24 of the tubular body section 20 is integrally connected to the first leg 22 at a substantially 90° angle. However, it is within the scope of the present invention to locate the second leg of the flexible coupling at an acute or obtuse angle relative to the first leg of the tubular body section.

A slot 26 is provided in the first leg 22 of the tubular body section 20. The slot extends the full length of the first leg and enables the first leg to be expanded open and snapped onto the unbroken tubular main line 14, as explained more fully below. The flexible nature of the coupling 10 together with the longitudinal slot 26 enables the first leg 22 to be opened or spread apart until the opening is just slightly larger than the exterior diameter of the main line 14. The first leg 22 of the coupling 10 is then fitted onto the main line 14 so that the opening 16 therein is in alignment with the second leg of the coupling 10.

In the embodiment of the present invention illustrated in FIGS. 1–4, each end portion of the first and second legs of the tubular body section 20 comprises corrugations formed by alternating annular peaks 28 and annular valleys 30. These corrugations are constructed and arranged to tightly fit over the corrugations of the lateral and main lines, 12 and 14, respectively. Accordingly, when the first leg 22 of the flexible coupling 10 is snapped onto the main line 14 the annular peaks 28 and valleys 30 at each end of the first leg 22 matingly engage the corrugations of the main line 14 to lock the coupling 10 to the main line 14 and thereby prevent axial shifting of the coupling relative to the main line.

As explained above, the free end portion of the second leg 24 of the tubular body section 20 comprises alternating annular peaks 28 and annular valleys 30. These corrugations are oversized with respect to the corrugations of the tubular lateral line 12, and they are constructed and arranged to tightly fit over he corrugations of the tubular lateral line when that line is connected to the flexible coupling 10. Connection of the tubular lateral line 12 to the flexible coupling 10 is accomplished by providing the free end portion of the second leg 24 with a longitudinally oriented slit 32 which enables the end portion of the second leg to be expanded open so as to increase its internal dimension whereby the end of the second leg can be snapped onto and over the tubular lateral line 12.

FIG. 5 illustrates another flexible coupling 40 according to the present invention. The coupling 40 is similar in many respects to the flexible coupling 10 shown in FIGS. 1–4 and similar reference characters are utilized to identify similar parts. The significant difference between the flexible coupling 40 and the embodiment shown in FIGS. 1–4 is that the corrugations 42 at the free end portion of the second leg 24 of the coupling 40 are substantially identical to the corrugations 44 of the tubular lateral line 12. A flexible split coupling 46 may be used to connect line 12 to coupling 40. The split coupling 46 comprises oversized corrugations 48 constructed and arranged to fit tightly over the corrugations 42 and 44. A long slit 50 extends the full length of the coupling 46. When the lateral line 12 is connected to the second leg 24 of the flexible coupling 40 the line 12 is brought into abutting relationship with the free end of the second leg 24. The split coupling 46 is then expanded open and snapped onto the line 12 and the second leg 24 so that one-half of the split coupling 46 matingly surrounds the lateral line 12 while the other half surrounds the corrugated end portion of the second leg 24. The longitudinally oriented slot 26 in the first leg of the tubular body section of coupling 40 enables the coupling to be snapped onto the main line 14 in the same manner as described above. This completes the connection of the lateral line 12 to the main line 14.

Figure 6:
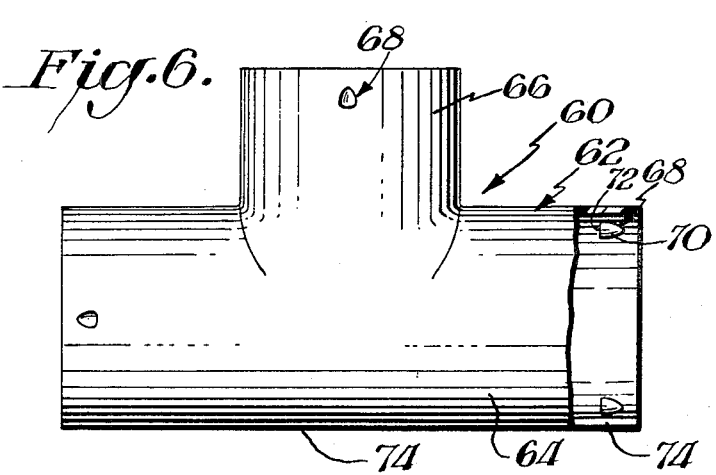
FIG. 6 is a top plan view of still another flexible coupling according to the present invention with portions broken away to show interior details.
Figure 7:
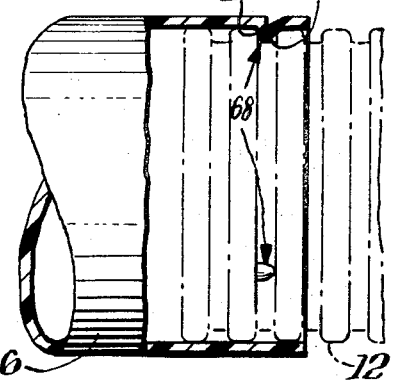
FIG. 7 is a partial side elevational view of the coupling shown in FIG. 6 with portions broken away to show interior details.

FIGS. 6 and 7 illustrate a coupling 60 comprising a straight-walled tubular T-shaped body section 62 formed by a first leg 64 and a second leg 66 integrally connected to the first leg at a substantially 90° angle. As described above, it is also within the scope of the present invention to dispose the second leg 66 at an acute or obtuse angle relative to the first leg 64. The straight-walled tubular body section 62 has a substantially uniform thickness throughout and is preferably fabricated from thermoplastic material by molding techniques known in the art. A plurality of locking lugs 68 is formed in the T-shaped tubular body section 62 at each end portion thereof. Numerous procedures may be followed for forming the locking lugs in the body section 62, such as suction or blow molding techniques, for example. Each locking lug 68 projects into the interior of the tubular T-shaped body section 62 and includes a guiding surface portion 70 and an abutment surface portion 72 located adjacent the guiding surface portion. The flexible coupling 60 also includes a longitudinally oriented slot 74 which is substantially parallel to the longitudinal axis of the first leg 64 of the T-shaped tubular body section 62.

The flexible coupling 60 is connected to a main line 14 in the same manner as described above in conjunction with the coupling shown in FIGS. 1–4. In this respect, the first leg 64 of the body section 62 is expanded open along the longitudinal slot 74 until the slotted opening is slightly larger than the exterior diameter of the main line 14. The first leg 64 of the coupling is then fitted over the main line 14 so that the opening 16 in the main line is in alignment with the second leg 66 of the coupling. The first leg 64 is then released to snap that leg onto and over the main line 14. The lugs 68 at the ends of the first leg 64 prevent the coupling 60 from axially shifting relative to the main line. It is not critical that the locking lugs 68 at the ends of the first leg 64 include guiding and abutment surface portions since the main line is not inserted into the ends of the first leg of the coupling 60. Instead, the coupling is simply snapped onto the main line and axial shifting of the coupling relative to the main line is prevented by the projecting lugs which fit into annular valleys in the corrugated main line 14.

On the other hand, the locking lugs 68 formed in the free end portion of the second leg 66 function to assist in establishing the locking relationship between the tubular lateral line 12 and the flexible coupling 60. The locking connection is accomplished by forcing the end of the corrugated lateral line 12 into the open end of the second leg 66 of the tubular body section 62. Initially, the corrugated lateral line 12 strikes the guiding surface portions 70 of the locking lugs 68 and as the lateral line is urged into the second leg 66 of the tubular body section 62 it slides across the guiding surfaces 70. The internal dimension defined by the locking lugs 68 at the free end of the second leg 66 is slightly smaller than the external dimension of the tubular lateral line 12. However, the flexible nature of the coupling 60 together with the flexibility of the lateral line 12 enables the line to enter into the second leg 66 of the coupling and slide past the locking lugs 68. Finally, each of the locking lugs 68 formed in the second leg 66 is positioned between an adjacent pair of corrugations in the tubular lateral line 12 after the first corrugation of that adjacent pair clears the guiding surface portions 70. Removal of the lateral line 12 is prevented through engagement between the first corrugation of the adjacent pair and the abutment surface portion 72 of the locking lugs 68 in the second leg 66 of the coupling 60.

As shown in FIGS. 6 and 7, the abutment surface portion 72 of each locking lug 68 formed in the second leg 66 is planar and the guiding surface portion 70 is inclined so as to cam the corrugated lateral line 12 into the second leg 66 of the tubular body section 62. The planar abutment surface portion 72 of each locking lug 68 formed in the second leg 66 is substantially normal to the longitudinal axis of the second leg of the body section. Thus, with corrugated tubing having substantially flat interconnecting portions between the peaks and valleys, the planar abutment surface portions 72 engage the flat interconnecting portions to thereby resist removal of the corrugated tubing from the second leg of the flexible coupling 60.

Another flexible coupling 80 according to the present invention is shown in FIGS. 8 and 9. In many respects the flexible coupling 80 is similar to the coupling 10 shown in FIGS. 1–4 and similar reference characters have been utilized to identify similar parts. One significant difference between the couplings 10 and 80 is that the longitudinally oriented slot 82 formed in the first leg 22 of the flexible coupling 80 is defined by a pair of arcuate flap portions 84 which comprise the first leg. As best shown in FIG. 8, the longitudinally oriented slot 82 has a width which varies along the length of the first leg 22 of the tubular body section 20. In use, the flexible coupling 80 is easily attached to a corrugated main line 14 by simply expanding the flap portions 84 away from one another. The expanding operation is easily carried out due to the reduction of material at the end portions of the first leg 22 of the body section 20.

What is claimed is:

1. A flexible coupling for interconnecting a tubular lateral line with an unbroken tubular main line comprising a T-shaped tubular body section having a first leg and a second leg integrally connected to the first leg at an angle thereto, and a slot in the first leg of the tubular body section extending the full length of the first leg whereby the first leg may be expanded open and snapped onto an unbroken tubular main line to facilitate interconnection of a tubular lateral line with a main line when the lateral line is secured to the free end of the second leg of the tubular body section, and wherein at least the end portions of the first leg of the tubular body section comprise corrugations formed by alternating annular peaks and valleys constructed and arranged to tightly fit over a corrugated main line.

2. A flexible coupling as in claim 1 wherein the end portion of the second leg of the tubular body section comprises corrugations formed by alternating annular peaks and valleys constructed and arranged to tightly fit over a corrugated lateral line, and a slit in the free end portion of the second leg of the tubular body section whereby the free end portion of the second leg may be expanded open and snapped onto a lateral line to facilitate connection of a lateral line to the second leg of the tubular body section.

3. A flexible coupling as in claim 1 wherein the free end portion of the second leg of the tubular body section comprises corrugations substantially similar to corrugations of a lateral line to be connected thereto.

4. A flexible coupling as in claim 1 wherein the first leg of the tubular body section includes a pair of arcuate flap portions spaced on opposite sides of the slot.

5. A flexible coupling for interconnecting a tubular lateral line with an unbroken tubular main line comprising a T-shaped tubular body section having a first leg and a second leg integrally connected to the first leg at an angle thereto, and a slot in the first leg of the tubular body section extending the full length of the first leg whereby the first leg may be expanded open and snapped onto an unbroken tubular main line to facilitate interconnection of a tubular lateral line with a main line when the lateral line is secured to the free end of the second leg of the tubular body section, and wherein the tubular body section is straight-walled, and locking lugs formed in the tubular body section at each end thereof projecting into the interior of the tubular body section and arranged to tightly fit over a corrugated main line.

6. A flexible coupling as in claim 5 wherein each locking lug at the free end portion of the second leg has a guiding surface portion and an abutment surface portion adjacent the guiding surface portion for preventing removal of tubing from the second leg of the tubular body section.

7. A flexible coupling as in claim 6 wherein the abutment surface portion of each locking lug at the free end portion of the second leg is planar and the guiding surface portion thereof is inclined to cam corrugated tubing into the second leg of the tubular body section.

8. A flexible coupling as in claim 6 wherein the planar abutment surface portion of each locking lug at the free end portion of the second leg is normal to the longitudinal axis of the second leg of the tubular body section.

* * * * *

PO-1050
(5/69)

UNITED STATES PATENT OFFICE
CERTIFICATE OF CORRECTION

Patent No. 3,669,473                    Dated June 13, 1972

Inventor(s) Ronald C. Martin and Marty E. Sixt

It is certified that error appears in the above-identified patent and that said Letters Patent are hereby corrected as shown below:

Column 1, line 31, correct the spelling of

"tubing"

Column 3, line 47, "he" should be -- the --

Column 6, line 37 (claim 8, line 1 of patent),

"6" should be -- 7 --.

Signed and sealed this 5th day of September 1972.

(SEAL)
Attest:

EDWARD M. FLETCHER, JR.            ROBERT GOTTSCHALK
Attesting Officer                Commissioner of Patents